Dec. 1, 1970 R. A. KAENEL ET AL 3,544,992

CODE TRANSLATOR

Filed June 1, 1967 6 Sheets-Sheet 1

INVENTORS R. A. KAENEL
J. L. SMITH

BY Herbert M. Shapiro

ATTORNEY

Dec. 1, 1970 R. A. KAENEL ET AL 3,544,992

CODE TRANSLATOR

Filed June 1, 1967 6 Sheets-Sheet 2

CODE TRANSLATOR

Filed June 1, 1967 6 Sheets-Sheet 6

United States Patent Office 3,544,992

Patented Dec. 1, 1970

3,544,992

CODE TRANSLATOR

Reginald A. Kaenel, Chatham, and James L. Smith, Bedminster, N.J., assignors to Bell Telephone Laboratories, Incorporated, Murray Hill, N.J., a corporation of New York Filed June 1, 1967, Ser. No. 642,865
Int. Cl. G06f *5/00*
U.S. Cl. 340—347 11 Claims

ABSTRACT OF THE DISCLOSURE

Domain wall sequence recognizers are adapted, for code translation in telephone signaling operations, to accept an output of a domain wall two-out-of-seven to one-out-of-twelve code converter. The recognizers replace relaye logic trees providing an easily coded and easily changed translator arrangement.

FIELD OF THE INVENTION

This invention relates to code converter and translator circuitry and, more particularly, to such circuitry including magnetic media in which stored information may be moved.

Code converters are presently in widespread use. For example, in present telephone systems, pushbutton telephones produce a multifrequency (MF) code in response to the depression of a digit-select button. Many central offices, however, are not equipped to handle directly anything but dial pulse codes. Therefore, a multifrequency-to-dial pulse converter is required and such a converter usually presupposes a signal converter that produces a two-out-of-seven (2/7) or two-out-of-five (2/5) pulse signal from the multifrequency (MF) signal.

Code translators also are widely used in operations related to code conversion. Each central office, MF or dial pulse, for example, must provide means responsive to particular codes or parts thereof for providing appropriate translation for called numbers. Specifically, code converters cannot operate in a manner to permit the conversion of only a full length telephone number, because a subscriber may dial a 0 for operator, or 211 or 411 codes, for example, for information and long distance service, respectively, or a local number, or a long distance number, or a long distance special service number, etc. Further, it is desirable to begin setting up the proper combination of switching office equipment as soon as possible to expedite the establishment of a connection. For example, upon receiving an area code, the office can begin the search for an outgoing trunk to a toll center. Thus, translation of codes of various length is necessary.

The complexity of a particular translator reflects its input and output requirements. If we look at the interface between a subscriber and the telephone system we can specify the number of outputs from the translator needed for acquiring the various services offered by a system and, in addition, the number of possible coded inputs to that translator. The requirements for the translator, then, are determined. In order to ensure complete flexibility for permitting future code changes of special code designations, the translator must be capable of responding to (recognizing) a thousand (10×10×10) possible input codes for say a three-digit code. For such a requirement, one thousand character (sequence) recognizers are required yet only twenty outputs may be required for availing a subscriber of the alternative services provided by the system. Not only is the translator necessarily of a degree of complication dictated by the input requirements, but also a concentrator is necessary at the output side to match the system requirements.

The familiar relay translator provides an example of translator complexity. A typical translator, say for a pushbutton telephone operation, employs electromechanical relays which are organized in groups of $n$ and driven, for example, by coded two-out-of-$n$ signals. A first coded decimal digit closes a coded number of relays in a first group of relays. A second coded decimal digit similiarly closes a coded number of relays in a second group of relays. Consecutive coded digits function, then, to establish through the groups of relays a series circuit corresponding to the sequence coded input signals and the different groups of relays are prewired to this end.

Relay translators prove to be relatively inflexible also. A typical relay arrangement is employed for both the 2/7 to dial pulse conversion and for the code translations. A given relay arrangement may be wired, ideally, to convert any given 2/7 code or set of 2/7 codes to provide appropriate dial pulse outputs. From a practical standpoint, however, relays have a limited number of contacts, usually fewer than twenty. Frequently almost all the contacts of many relays are in use in the wiring for the conversion of input 2/7 codes to dial pulses, thus limiting the availability of many relays for providing additional code translation possibilities. In addition, once a relay arrangement is wired for the translation of a particular set of codes, a change in the code requires a change in wiring which is time consuming to effect and thus expensive. Consequently, the number of different codes available is limited by practical considerations in the first instance and changes in presently used codes are costly in the second.

An object of this invention is to provide a new and novel code translator.

The present invention is described in terms of a translator supplemental to the MF to 2/7 conversion. The translator itself includes two-out-of-seven to one-out-of-twelve (1/12) code conversion, the conversion to one-out-of-twelve code, rather than to a one-out-of-ten code, permitting the use of additional codes in the pushbutton subset when twelve pushbuttons are employed rather than the more familiar ten.

SUMMARY OF THE INVENTION

This invention is based on the realization that domain wall character recognizers (generally shift register sequence recognizers) may be adapted to fulfill the function of prewired relay arrangements and may themselves be coded to respond to multiple input codes as do the relay arrangements. The prime advantage, however, is that the codes to which the domain wall character recognizers respond are in no way limited by the availability of contacts to particular elements and that changing or adding codes is a relatively simple and thus economical matter.

The invention is further based on the recognition that the adaptation of a domain wall recognizer to the code translation function in accordance with this invention requires a two-out-of-$n$ to one-out-of-$m$ converter provided in a simple manner also by turning a domain wall device to account. Specifically, copending application Ser. No. 557,810, filed June 15, 1966, now Pat. No. 3,466,628 for R. A. Kaenel and J. L. Smith, describes a domain wall device in which reverse magnetized domains of characteristic coded lengths are nucleated in a magnetic wire in response to each of a two-out-of-seven input code. In accordance with the present invention, reverse magnetized domains of characteristic (coded) length are nucleated in an initialized magnetic wire in response to each input code and, subsequently, advanced through the wire. Each such domain is bounded by a leading and trailing domain wall. Each domain of coded length is advanced, then, through the wire until its leading domain wall passes a prescribed position. At the time the leading domain wall passes that position, however, a second reverse domain (one bit long) is nucleated thirteen positions spaced apart (and following) the leading wall. The domain of coded length thereafter is advanced to an output position there enabling a sequence of zero pulses interrupted by a one pulse in a coded position controlled by the corresponding trailing domain wall, and followed by a sequence of zeros terminated by the leading wall of the corresponding second domain. Each two-out-of-seven input code is thus converted to a sequence of binary zeros initiated by the leading wall of a domain coded length, terminated by the following second domain, and including a binary one in a position in that sequence of zeros determined by the corresponding trailing domain wall of the domain of coded length.

For reference, a domain wall device is a device including a magnetic medium, conveniently a wire, in which reverse magnetized domains are nucleated in response to a first field in excess of a nucleation threshold and through which reverse domains are advanced in response to a second field in excess of a propagation threshold but less than the nucleation threshold. Such devices are usually operated by providing a first field in a limited input position of an initialized magnetic wire and, thereafter, by applying step-along second fields over consecutive limited portions of the wire to advance the domain to an output position. Domain wall devices are described in K. D. Broadbent, Pat. 2,919,432, issued Dec. 29, 1959.

A feature of this invention is a code converter including means responsive to coded input signals for providing reverse domains of corresponding coded lengths in a magnetic medium, means moving such domains in a first direction through that medium, and means responsive to the arrival of the leading wall of each of such domains at a prescribed position for providing a corresponding second domain spaced apart a characteristic distance from the corresponding leading wall.

Another feature of this invention is a code converter including means responsive to coded input signals for providing reverse domains of corresponding coded length, means responsive to the advance of such domains to a prescribed position for providing a corresponding second domain spaced apart a coded position, means advancing reverse domains to an output position, means responsive to the leading wall of a first domain and the corresponding second domain for initiating and inhibiting a sequence of binary zeros, respectively, and means responsive to the trailing wall of the first domain for positioning a binary one in that sequence.

A further feature of this invention is a code translator including a code converter responsive to input signals for providing a sequence of signals each representing a first binary value including a signal representing a second binary value in a coded position in that sequence and a plurality of sequential character recognizers each responsive to an output of that code converter.

DETAILED DESCRIPTION

Figure 1:
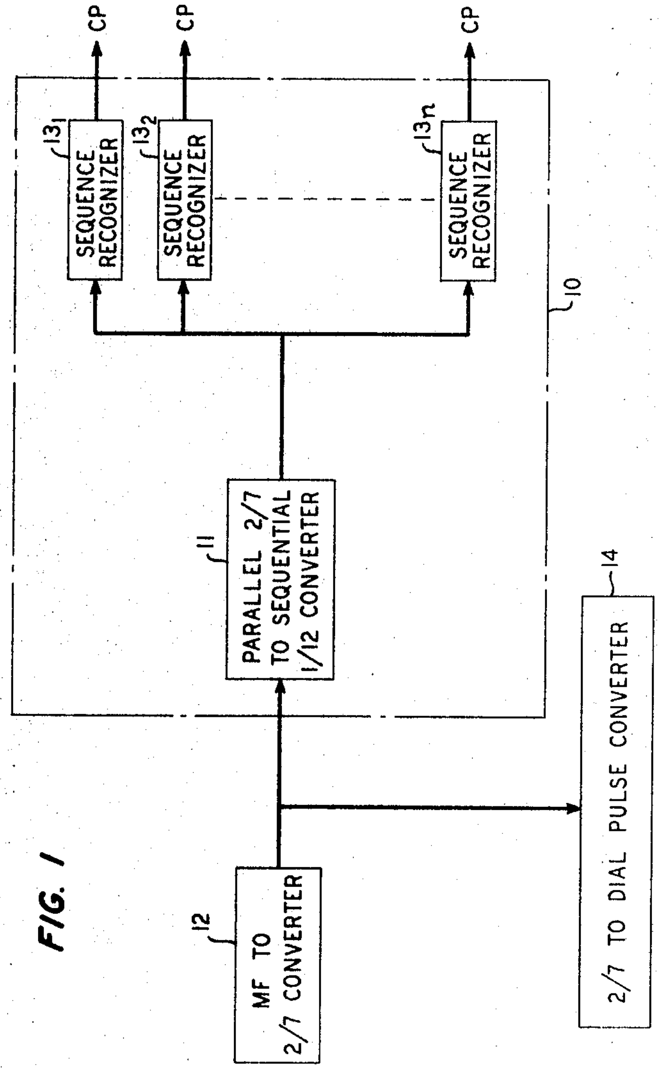
FIG. 1 is a block diagram of a translator in accordance with this invention.

FIG. 1 shows a translator arrangement 10 comprising a code converter represented by a block designated 11 in FIG. 1 and described in detail in connection with FIG. 2. Block 11 is shown connected between an output of an MF to 2/7 converter represented by a block 12 in FIG. 1 and inputs to a plurality of character recognizers (sequence detectors) represented by blocks $13_1, \ldots 13_n$ in FIG. 1. The outputs of the character recognizers are connected to a central processor CP as indicated also in FIG. 1. The output of the MF to 2/7 converter is connected to the input of a 2/7 to dial pulse converter represented by a block 14.

The organization and operation of an MF to 2/7 converter and a 2/7 to dial pulse converter supplemented in accordance with this invention are disclosed in the above-mentioned copending application for R. A. Kaenel and J. L. Smith and are, accordingly, not discussed further herein. A suitable character (sequence) recognizer adaptable in accordance with this invention is disclosed in copending application Ser. No. 537,755, filed Mar. 28, 1966, now U.S. Pat. No. 3,439,351 for J. L. Smith.

First, the code converter, represented by block 11 in FIG. 1, and an illustrative operation thereof are described.

Figure 2:
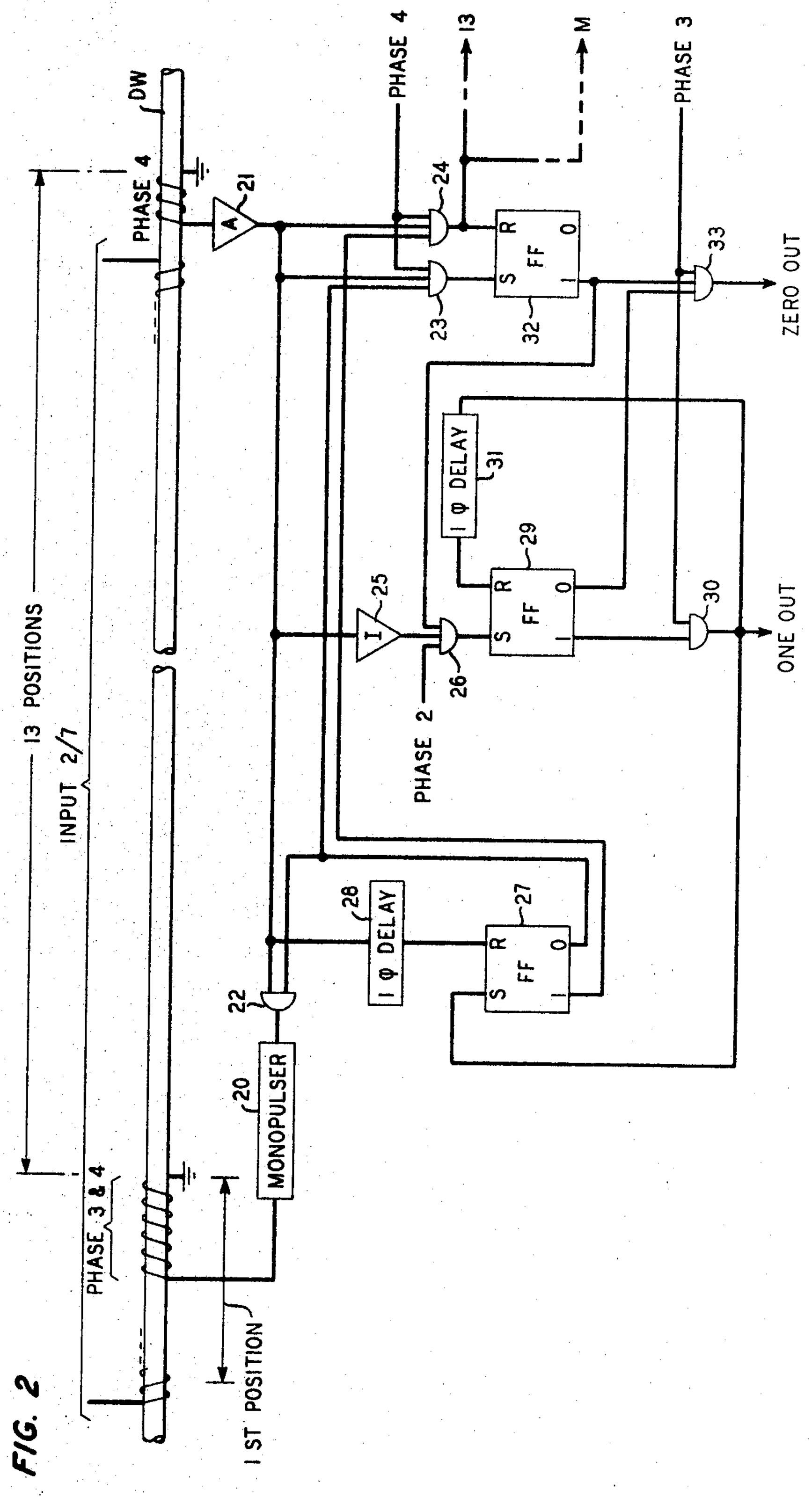
FIG. 2 is a schematic illustration of a code converter in accordance with this invention.

FIG. 2 shows the code converter 11 in detail. The converter comprises a domain wall wire DW to which a plurality of input conductors are coupled in a manner to provide a reverse magnetized domain of corresponding coded length in response to a coded one of a set of coded input signals. The above-mentioned copending Kaenel-Smith application describes such an input arrangement in detail. It is helpful to summarize such an arrangement before proceeding and this summary is rendered in connection with FIGS. 3 and 4.

Figure 3:
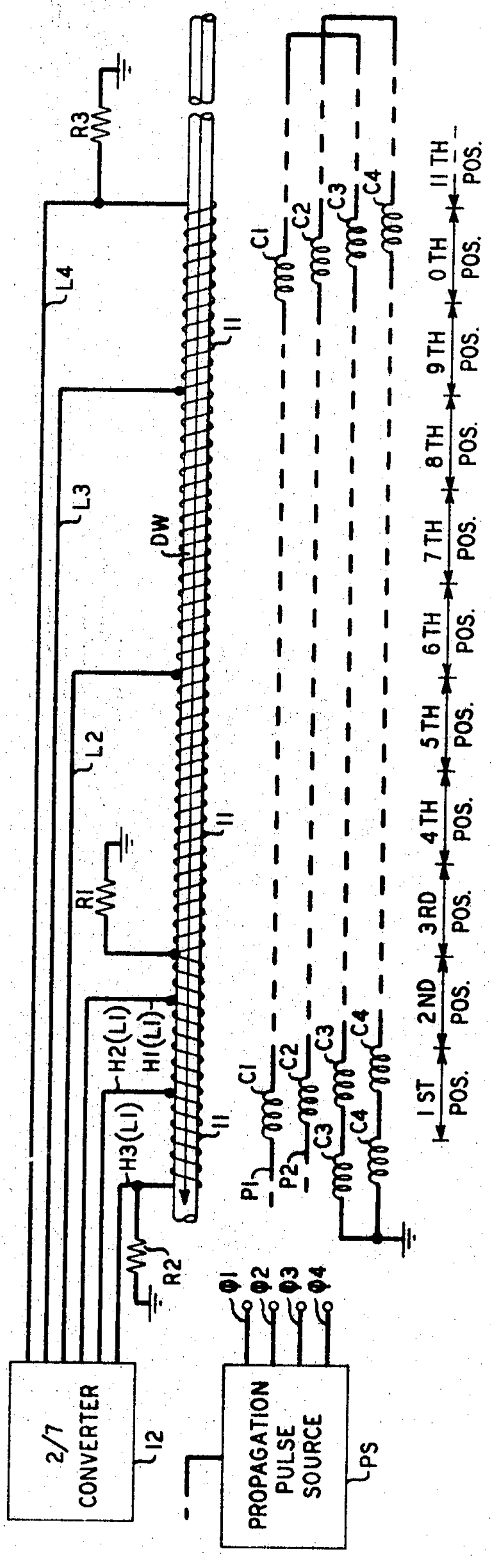
FIGS. 3, 4 and 7 are schematic illustrations of portions of the translator of FIG. 1 showing the magnetic condition thereof during operation.

FIG. 3 shows a domain wall wire DW coupled by propagation conductors P1 and P2. The propagation conductor couplings are in the conventional fashion defining next adjacent positions along the domain wall wire by each set of next adjacent coils C1, C2, C3, and C4. The first through 0th positions plus an eleventh positions are indicated in FIG. 3 and can be seen to align with corresponding coil sets. Conductors P1 and P2 are connected between a propagation pulse source PS and ground.

Conductors H1, H2, H3, L1, L2, L3, and L4 are connected between MF to 2/7 code converter 12 and different positions along a coil 11 also coupled to wire DW. This is clear from a glance at FIG. 3. For example, conductor H3 and conductor L4 are connected to the ends of coil 11. Conductor H2 is connected to coil 11 at the middle of the first position therealong as shown in FIG. 3. Conductor H1 is connected to coil 11 at the middle of the second position. Conductors L2 and L3 are connected to coil 11 between the fifth and sixth and between the eighth and ninth positions respectively. Coil 11 is grounded at its ends via resistors R2 and R3 and between the second and third positions via resistor R1.

Figure 5:
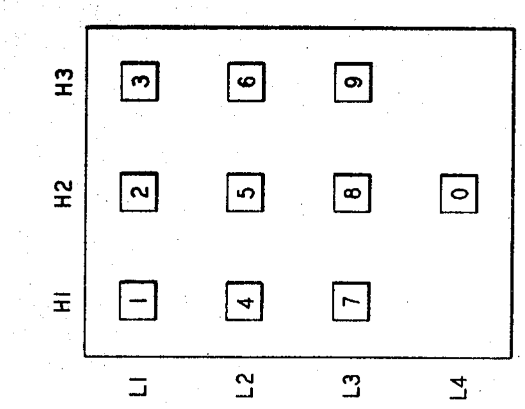
FIG. 5 is a schematic layout of a pushbutton dial arrangement.
Figure 4:
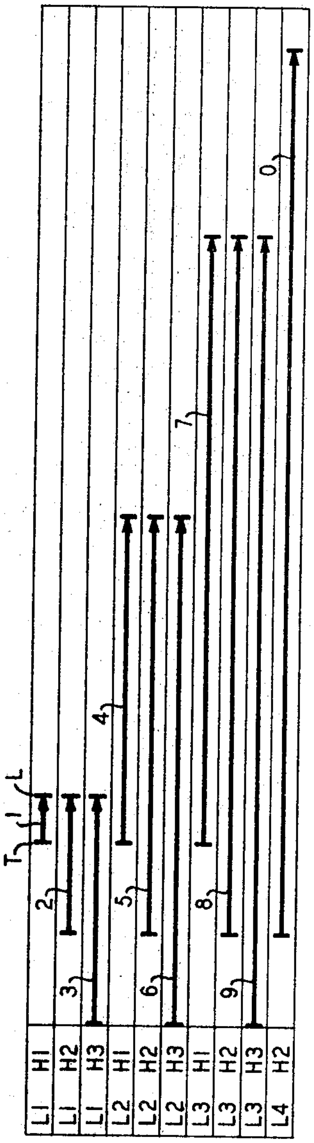

The conductors from converter 12 are designated to correspond to the pushbutton type telephone pushbutton designations. The buttons are arranged in a matrix as shown in FIG. 5 where the rows are designated as L1 . . . L4 reading from top to bottom and the columns are designated H1 . . . H3 reading from left to right. The depression of a pushbutton 5, for example, activates conductors H2 and L2 providing a reverse magnetized domain designated 5 in FIG. 4. The reverse domains are indicated in FIG. 4 by an arrow directed to the right and bounded by leading and trailing domain walls L and T respectively. In the absence of such a domain, wire DW is in an initialized condition represented by the arrow directed to the left in FIG. 3. The domains provided by the activation of the pair of coded wires in FIG. 3 are shown in FIG. 4, designated to the left as viewed, to correspond to the domain of corresponding length. Thus, for example, the depression of pushbutton 7 corresponds to conductors H1 and L3 as shown in FIG. 5. FIG. 4 shows a reverse domain designated 7 to correspond to the L3–H1 designation.

The L1 designation is seen to be redundant, conductors H1, H2, and H3 alone being sufficient to provide domains of three different characteristic lengths, corresponding to pushbuttons 1, 2, and 3, respectively, in the absence of such a conductor. It is shown, however, to be consistent with the illustrative 2/7 code conversion. FIG. 3 shows the H1, H2, and H3 designations accompanied by the L1 indication in parentheses to indicate the redundancy. The details of the operation of the circuit of FIG. 3 are discussed further in the above-mentioned copending Kaenel-Smith application. We may accept here that the depression of a pushbutton results in a reverse domain of characteristic length in wire DW.

FIG. 2 shows domain wall wire DW of FIG. 3 in the context of the code converter 11 of FIG. 1. The inputs to wire DW are omitted in FIG. 2 for clarity. In the description of the converter, the terms phase one, phase two . . . etc. are used. Such terms designate a phase of the four-phase propagation sequence for advancing reverse domains and correspond to the coils C1, C2, C3, and C4 activated during the correspondingly numbered phase. Pulse source PS in FIG. 3 is shown including four outputs *d*1, *d*2, *d*3 and *d*4, the consecutive activation of which provides the four-phase propagation sequence. The correspondence, of course, holds as to positions also. Thus phase four, for example, refers to that position to which the leading domain wall of a domain advances during the fourth phase. That position is the right end of a coil C4 as viewed in FIG. 3.

The first position shown in FIG. 3 is also indicated in FIG. 2. The output of a monopulser 20 is coupled to the third and fourth phase of the first position as indicated. The input to an amplifier 21 is coupled to the fourth phase of a position thirteen positions to the right of the first position as indicated in FIG. 2. The output of amplifier 21 is connected to an input of each of AND circuits 22, 23, and 24 and, via an inverter 25, to an input of an AND circuit 26. The output of amplifier 21 also is connected to a reset input of a flip-flop 27 through a one-phase delay 28. The reset output of flip-flop 27 is connected to another input of each of AND circuits 22 and 23, and the set output of flip-flop 27 is connected to another input of AND circuit 24. Flip-flop 27 is of a type to provide an output when it is in either the set or reset condition.

The phase two outputs, *d*2, of sorce PS of FIG. 3 is connected to an input of AND circuit 26 and a phase four output, *d*4, of source PS is connected to an input of each of AND circuits 23 and 24.

The output of AND circuit 26 is connected to the set input of a flip-flop 29. The set output of flip-flop 29 is connected to an input of an AND circuit 30. Another input of AND circuit 30 is connected to a phase three output, *d*3, of source PS. The output of AND circuit 30 provides a one output to the character recognizers, shown in FIG. 1, in a manner to be described in detail in connection with FIG. 7. The output of AND circuit 30 is also connected to the set input of flip-flop 27 and to the reset input of flip-flop 29. The later connection is via a one-phase delay 31.

The outputs of AND circuits 23 and 24 are connected to the set and reset inputs of a flip-flop 32. The set output of flip-flop 32 is connected to an input of an AND circuit 33 and to an input of AND circuit 26. The phase three output, *d*3, of source PS also is connected to an input of AND circuit 33. The reset output of flip-flop 29 also is connected to an input of AND circuit 33. The output of AND circuit 33 provides a zero output to the character recognizers of FIG. 1 also as explained in connection with FIG. 7. Flip-flop 29 also is of a type to provide an output when it is either in the set or reset condition.

The circuit functions to advance a reverse domain of characteristic length until the leading wall thereof passes the position coupled by the input to amplifier 21 and, then, to provide a second reverse domain thirteen positions from the leading wall of the first domain. The two reverse domains are subsequently advanced synchronously along wire DW of FIG. 3. The operation of the circuit of FIG. 2 is more easily understood in this context.

The depression of a pushbutton of FIG. 5 then activates source PS for pulsing propagation conductors P1 and P2 in four-phase fashion to advance a domain provided in wire DW. Consider a domain, designated 1 in FIG. 4, advanced by those propagation pulses until the leading wall L thereof reaches that position along wire DW coupled by the input to amplifier 21. That position is designated phase four in FIG. 2 as indicated above. The wall L induced a pulse in the coupling for enabling AND circuits 22, 23, and 24, and after a one-phase delay, for resetting flip-flop 27.

Let us assume that flip-flop 27 is in a reset state initially. Accordingly, in response to the pulse induced by wall L, AND circuit 22 is activated and monopulser 20 provides an output for providing a reverse domain in the third and fourth phases of the first position as shown in FIG. 2. We now have, in wire DW, a first domain of coded length followed by a second domain spaced thirteen positions behind the leading wall of the first domain. Source PS continues to pulse propagation conductors P1 and P2 for advancing the domains in the wire.

Also in response to the pulse induced by wall L, AND circuit 23 is activated and flip-flop 32 is set. On the next phase two, AND circuit 26 is activated, being enabled by the concurrent advance of a trailing wall (of a digit one representation) past the position in wire DW coupled by the input to amplifier 21. In this connection, it may be observed in FIG. 4 that a trailing wall always is two phases out of phase with a leading wall and thus passes a fourth phase position (for a leading wall) during a second phase of the propagation sequence. Flip-flop 29 is now set and, on the following phase three, AND circuit 30 is activated providing a one output. The output of AND circuit 30 also sets flip-flop 27 and, via a one-phase delay, resets flip-flop 29 deactivating AND circuit 30.

The circuit of FIG. 2 provides, then, that each phase three pulse enables AND circuits 30 and 33 and that AND circuit 33 provides an output (zero) only when flip-flop 29 is reset and a leading domain wall has advanced past the position coupled by the input to amplifier 21 thus setting flip-flop 32. On the other hand, a trailing wall advancing past the position coupled by the input to amplifier 21 sets flip-flop 29 and causes AND circuit 30 to be enabled and AND circuit 33 to be disabled. A one output is provided. The next subsequent phase three pulse, however, finds AND circuit 33 again enabled and zero outputs continue. A one output, accordingly, is provided in a coded position, in a sequence of zero outputs, determined by the coded distance between the leading and trailing domain walls of the domain of coded length.

The leading wall of the second domain spaced apart thirteen positions from the leading domain wall of the first domain now passes the position coupled by the input to amplifier 21. Both AND circuits 23 and 24 are enabled; flip-flop 27 is still set, however. Accordingly, the next fourth phase pulse resets flip-flop 32 via AND circuit 24 simultaneously providing an output to deactivate propagation source PS after a four-phase delay. Flip-flop 27 is reset on the next phase (one). Thus, when the leading wall of a second domain is so advanced, neither a one nor a zero output is provided, and the code converter is restored to an off position.

On the next subsequent second phase, the trailing wall of the second domain is advanced past the position coupled by the input to amplifier 21. Flip-flop 32 is still in the reset condition. Therefore AND circuit 26 is disabled and flip-flop 29 remains reset. Neither a one nor a zero output is provided and the advance pulses are discontinued.

Figure 6:
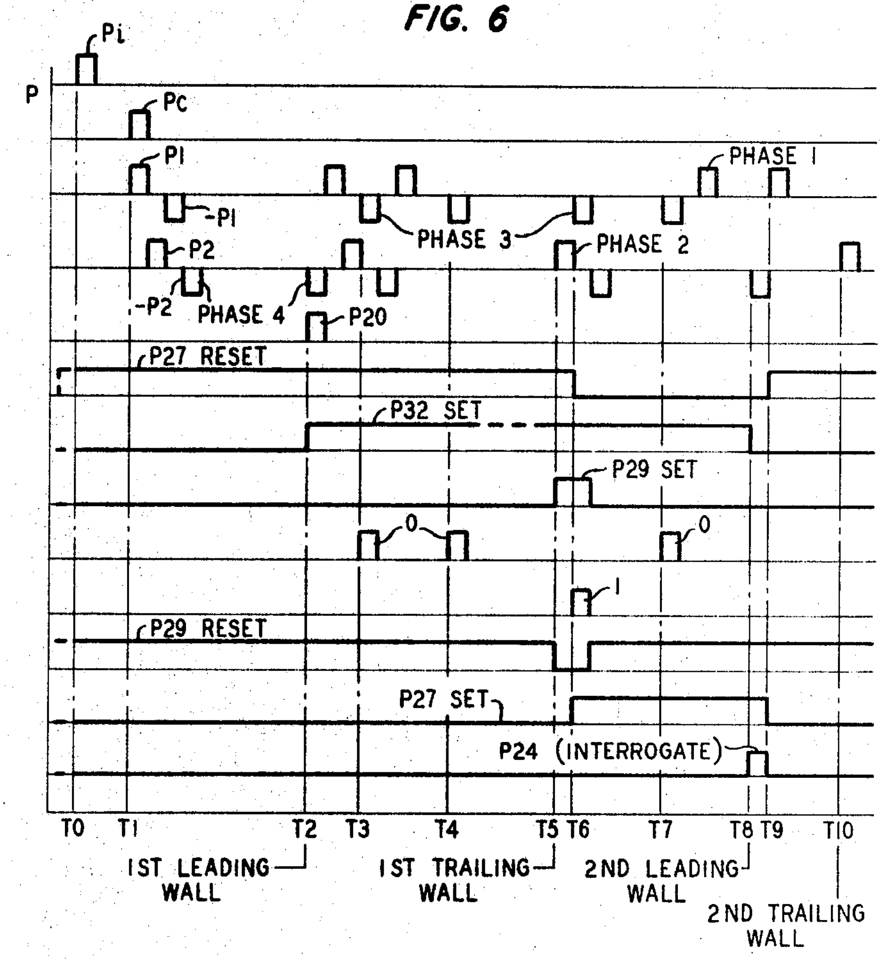
FIGS. 6 and 9 are pulse diagrams of the operation of portions of a translator in accordance with this invention.

FIG. 6 is a pulse diagram of the circuit of FIG. 2. If we assume that a subscriber goes off-hook at time $t0$ as shown in FIG. 6, then an initiating pulse P$i$ is applied at that time to initiate the character recognizers of FIG. 1 as is described during the description of those recognizers in connection with FIGS. 7 and 8. The subscriber next depresses a pushbutton of FIG. 5 applying to the coded inputs of FIG. 2 coded pulses shown as pulse P$c$ in FIG. 6 at time $t1$. The propagation sequence ($d1$, $d2$, $d3$, and $d4$) is initiated at the same time as shown by the pulses P1, P2, —P1, and —P2 in FIG. 6.

Flip-flops 27, 29, and 32 are initially in reset states. At time $t2$ as shown in FIG. 6, the leading wall of the first domain (of coded length) causes monopulser 20 to provide the second domain as already described. This happens on a fourth propagation phase. Thus flip-flop 32 is set. Subsequent phase three pulses are accompanied by 0 outputs designated –0– at times $t3$ and $t4$.

Subsequently, at time $t5$ in FIG. 6 the trailing domain wall of the first domain passes the amplifier 21 coupling as a phase two pulse is applied. In response, flip-flop 29 is set and a next subsequent phase three pulse is accompanied by a one output. The one output is designated –1– at time $t6$ in FIG. 6.

The one output sets flip-flop 27 and, one phase later, resets flip-flop 29. Flip-flop 32 is still in a set condition, and next subsequent phase three pulses are accompanied by zero outputs as indicated at time $t7$ in FIG. 6.

The leading wall of the second domain passes the input coupling of amplifier 21 at time $t8$. A phase four pulse is applied at that time. In response, flip-flop 32 is reset and an interrogate pulse P24 is provided. One phase later, flip-flop 27 is reset as shown at time $t9$ in FIG. 6. Two propagation pulses later, on the next subsequent second phase pulse, the trailing wall of the second domain passes the input coupling to amplifier 21. This is shown at time $t10$ in FIG. 6. Although such passage of the trailing domain wall is accompanied by a second phase pulse, flip-flop 32 is in a reset condition and, consequently, flip-flop 29 is not set.

The operation of the code converter of FIG. 2 is most easily remembered in terms of the states of the various elements therein when a leading or a trailing domain wall passes that position in wire DW coupled by the input to amplifier 21 in FIG. 1. These junctures in the operation, accordingly, are emphasized in the above discussion of the pulse diagram of FIG. 6. The following table shows the one-out-of-twelve codes generated by the circuit of FIG. 2 in response to the corresponding coded inputs, discussed in connection with FIGS. 3, 4, and 5, which determine the coded distances between the leading and trailing walls of the first domains.

| | |
|---|---|
| L1 H1 | 000000000001 |
| L1 H2 | 000000000010 |
| L1 H3 | 000000000100 |
| L2 H1 | 000000001000 |
| L2 H2 | 000000010000 |
| L2 H3 | 000000100000 |
| L3 H1 | 000001000000 |
| L3 H2 | 000010000000 |
| L3 H3 | 000100000000 |
| L4 H2 | 001000000000 |

Figure 7:
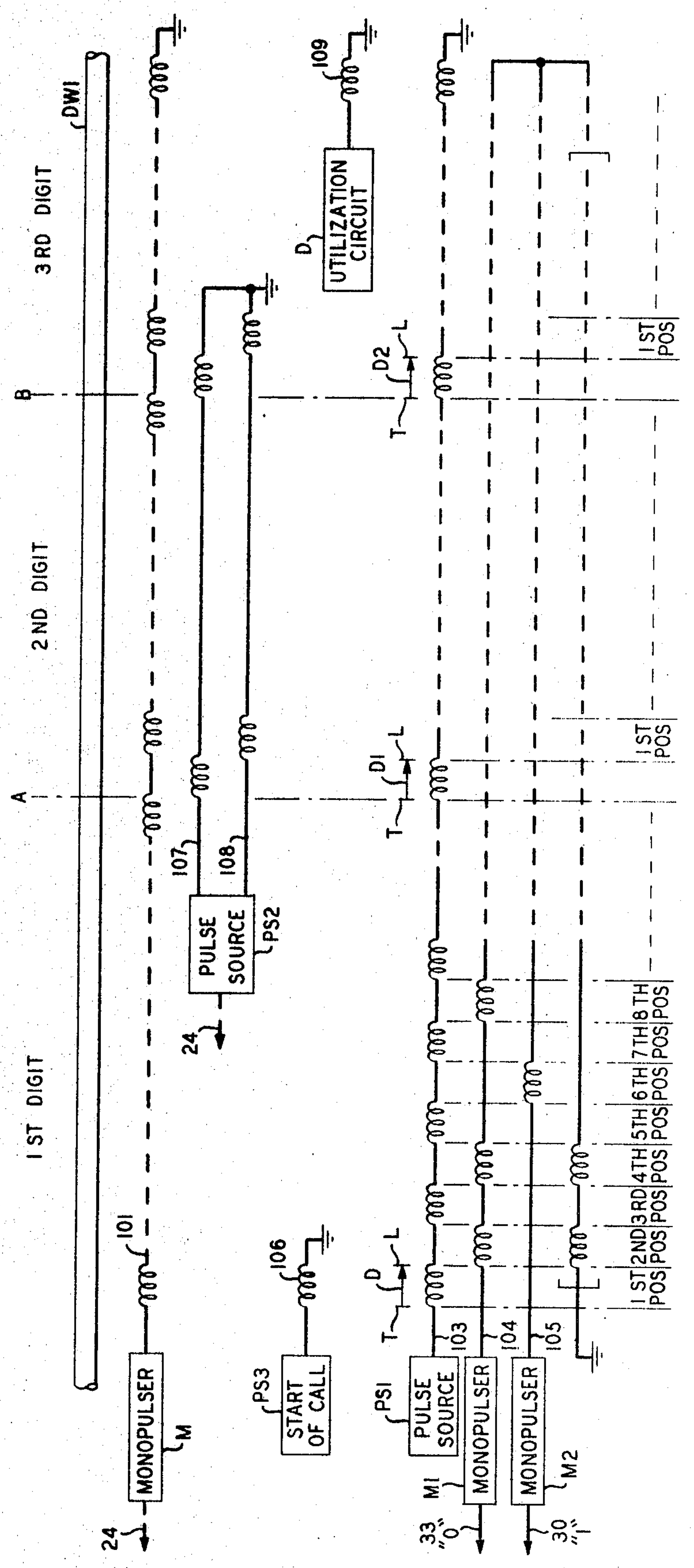

The output of AND circuit 24 not only deactivates source PS but also provides what is termed an annihilate or interrogate output herein. Such an output is applied along with the one and zero outputs to the bank of character recognizers shown in FIG. 1. The character (sequence) recognizers operate in identical manner but are coded differently. FIG. 7 shows a representative character recognizer. The organization of such a recognizer is discussed in connection with FIG. 7 followed by a discussion of the coding of various character recognizers and the general operation thereof. Thereafter, an illustrative operation of the circuit of FIG. 1 for a particular code is discussed.

First, in general, the character recognizers operate in parallel in response to the one-out-of-twelve code generated by code converter 11. When a subscriber depresses a pushbutton, a domain is nucleated in each character recognizer. The domain is expanded by consecutive fields generated via coils coupled to a domain wall wire in each recognizer. Those coils are coded, however, and only in the recognizers where the coil code corresponds to the selected one-out-of-twelve code are the consecutive fields poled properly for the domain to expand to encompass a prescribed (safe) position. The domains in all recognizers subsequently are annihiliated except for domains in safe positions. Those domains so remaining are advanced then to positions from which they are advanced further in response to the one-out-of-twelve code representing a next decimal digit.

Each character recognizer as, for example, recognizer 13$_1$ of FIG. 1 comprises, illustratively, a domain wall wire DW1. Three digit codes are shown illustratively so each domain wall wire is coupled by a plurality of conductors to code wire DW1 for three consecutive decimal digit representations to respond accordingly. To simplify the explanation of the coded couplings and the operation of the recognizers, it is convenient to think of the domain wall wire of FIG. 7 divided into three portions corresponding to the first, second, and third digits in a code sequence. FIG. 7 shows wire DW1 so designated, the divisions between the three portions being indicated by vertical broken lines designated A and B. Further, although the wires DW1 are not coupled by the coils of a four-phase propagation circuit as shown in FIG. 3, it is convenient to think of the wires DW1 as divided into positions as defined by those coils as discussed in connection with FIG. 3.

A conductor 101 couples wire DW1 along its entire length except for positions thereof next adjacent broken lines A and B as shown in FIG. 7. Conductor 101 is connected between the output of a monopulser M and ground. Monopulser M is activated via AND circuit 24 of FIG. 2 and serves to pulse conductor 101 to interrogate wires DW1 during a fourth phase pulse as is explained more clearly hereinafter.

An additional conductor 103 couples each recognizer wire DW1 along consecutive spaced apart positions which correspond to odd-numbered positions along wire DW of FIG. 3 each coupled by a set of next consecutive coils C1 through C4 as shown in that figure. FIG. 7 shows the coils of conductor 103 corresponding to odd-numbered position indications. All the couplings between conductor 103 and a wire DW1 are in the same sense. Conductor 103 is connected between a pulse source PS1 providing pulses synchronized with the phase four output of propagation pulse source PS of FIG. 3 and ground.

A conductor 104 couples wire DW1 along prescribed ones of those even-numbered positions therealong left uncoupled by conductor 103 where consecutive ones of those so uncoupled positions correspond to consecutive bits in the code to be recognized. For example, conductor 104 couples the first, second, and fourth through the twelfth of such even-numbered uncoupled positions starting from the left as viewed in FIG. 7. The couplings then correspond to the zeros in the code, L1 H3 in the table above, to be recognized. Conductor 104 is connected between the output of a monopulser M1 and (normally directly to) ground. Monopulser M1 is activated by the (zero) output of AND circuit 33 of FIG. 2 accordingly.

Similarly, a conductor 105 is coupled to the third such uncoupled position as shown in FIG. 7 representing a one in the code to be recognized. Conductor 105 is also connected between the output of a monopulser M2 and (normally directly to) ground. Monopulser M2 is activated via the (one) output of AND circuit 30 of FIG. 2. It is clear that conductors 101, 104, and 105 are activated severally according to the corresponding annihilate, one, and zero outputs of code converter 11 of FIGS. 2 and 3.

A conductor 107 couples those positions along wire DW1 left uncoupled by interrogate conductor 101. A conductor 108 couples each position next adjacent those coupled by conductor 107 as shown in FIG. 7. Conductors 107 and 108 are connected between a pulse source PS2 and ground. Pulse source PS2 is responsive to an output from AND circuit 24 for providing consecutive pulses on conductors 108 and 107, after a one-phase delay, as will become clear.

It is important to keep in mind that each decimal digit is converted into a sequence of zeros with a one in a coded position in the sequence. A sequence of zeros with a one in a third position corresponds to a decimal three. The coding shown for the first digit portion of wire DW1 of FIG. 7 then is coded for recognizing a decimal three as the first digit of a code. The "zero" coils are defined in conductor 104 in the first and second and fourth through the twelfth even-numbered positions. The "one" coil is defined by conductor 105 in the third even-numbered position. A one-out-of-twelve code corresponding to a digit three causes a domain in wire DW1 to expand in response to a sequence of fields until a safe position is reached as is illustrated hereinafter.

FIG. 7 shows, in addition, that conductors 104 and 105 include a common return path to ground through a bracketed portion of wire shown coupled to the first and second even-numbered positions left uncoupled by conductor 103 as described above. Such couplings are not additional to the other couplings but instead may be substituted for (zero) couplings defined by coils along conductor 104. Such substituted couplings serve as "don't care" couplings permitting, as will become clear hereinafter, a recognizer to recognize a one and a two instead of a three as the first digit of the code. To this end, the one coil defined in the third even-numbered position by conductor 104 is replaced by a zero coil. "Don't care" coils enable a single recognizer to recognize multiple codes and thus permit the number of services offered by the system to determine the number of recognizers needed. In the absence of a one-out-of-*m* code, "don't care" coils could not be so used and a recognizer would be necessary for each code regardless of the number of services offered.

Although not shown in detail, conductor 104, of recognizer $13_1$ of FIG. 1, may be taken to couple all even-numbered positions uncoupled by conductor 103 in the portion of wire DW1 corresponding to the second digit as shown in FIG. 7 except the second such even-numbered position. In addition, conductor 104 may be taken to couple all such even-numbered positions except the first so uncoupled position in the portion corresponding to the third digit as indicated in FIG. 7. Conductor 105 couples the remaining even-numbered positions. That is to say, conductor 105 couples the second even-numbered position and the first even-numbered position in the portions of wire DW1 of recognizer $13_1$ corresponding to the second and to the third digit portions thereof, respectively. The code 321 is, accordingly, recognized by recognizer $13_1$. If "don't care" coils (along conductors 104 and 105) couple the first and second positions in the portion of wire DW1 corresponding to the first digit portion as shown in FIG. 7 and if the "one" coupling to the third even-numbered position there is removed, then the codes 121 and 221 are recognized by recognizer DW1 instead.

A conductor 106 is coupled to wire DW1 at the first position also coupled by conductor 103 as shown in FIG. 7. Conductor 106 is connected between ground and a source of a "start of call" signal source PS3 providing a reverse magnetized domain in the coupled position of each recognizer when activated. Such a signal is provided by a telephone subset when the receiver is raised from its cradle or when a digit-select button is depressed and, conveniently, initiates the operation of the circuit of FIG. 2 also.

A conductor 109 is coupled to a position along domain wall wire DW1 corresponding to the right of the third digit portion also coupled by conductor 103. Conductor 109 is connected between a utilization circuit D and ground. Such a utilization circuit is common to telephone central office equipment (i.e., CP of FIG. 1) and serves to provide connect service in response to an output from the corresponding recognizer.

A start of call signal, then, pulses conductor 106 and provides a reverse magnetized domain D in each domain wall wire DW1. The domain is represented by an arrow directed to the right as shown in FIG. 7 and bounded by leading and trailing domain walls L and T, respectively, as described above.

Each time source PS of FIG. 3 pulses conductor P2 negatively as in phase four, conductor 103 is pulsed and advance (or propagation) fields are generated thereby in the coupled positions along wire DW1 of each recognizer. For the position initially selected for domain D nothingg happens at this juncture. Let us assume that a 321 code is dialed, remembering that a three is represented as 000000000100. Let us assume also that an illustrative recognizer is coded to recognize only that code (i.e., no "don't care" coils). Reading that three representation from right to left, we see a 0 is the first output from the circuit of FIG. 2. Consequently, conductor 104 is pulsed, via monopulser M1 in response to the appropriate output of the circuit of FIG. 2, and wall L of domain D moves to the right as viewed. A next propagation pulse, similarly applied via monopulser M2, to conductor 103 advances the wall again to the right. Next, another zero is applied by the circuit of FIG. 2 to conductor 104 and the wall again moves to the right. A one is next in sequence. In response, conductor 105 is pulsed, via monopulser M2 in response to a one output from the circuit of FIG. 2, and wall L moves further to the right. The sequence continues until the wall L reaches the safe position in wire DW1 uncoupled by conductor 101. A next propagation pulse on conductor 103 advances wall L into the portion of wire DW1 uncoupled by conductor 101.

The circuit of FIG. 2 now provides an interrogate signal in conductor 101 (i.e., the output P24 from AND circuit 24). Such a signal annihilates all domains except those occupying positions in wires DW1 uncoupled by conductor(s) 101. Only in the recognizer coded to accept the selected code is a domain in such a position. Such a domain is designated as D1 in FIG. 7.

The conductors 108 and 107 are now pulsed consecutively in a manner to advance domain D1 one position to the right so that the leading wall of that domain is positioned to advance in response to the first binary bit of the second decimal digit of the incoming code.

Figure 9:
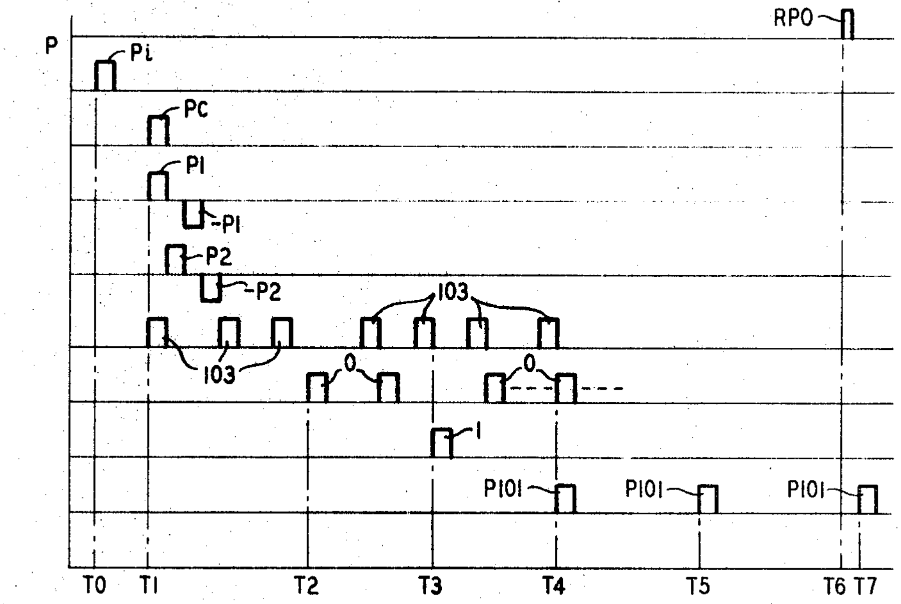
Figure 8:
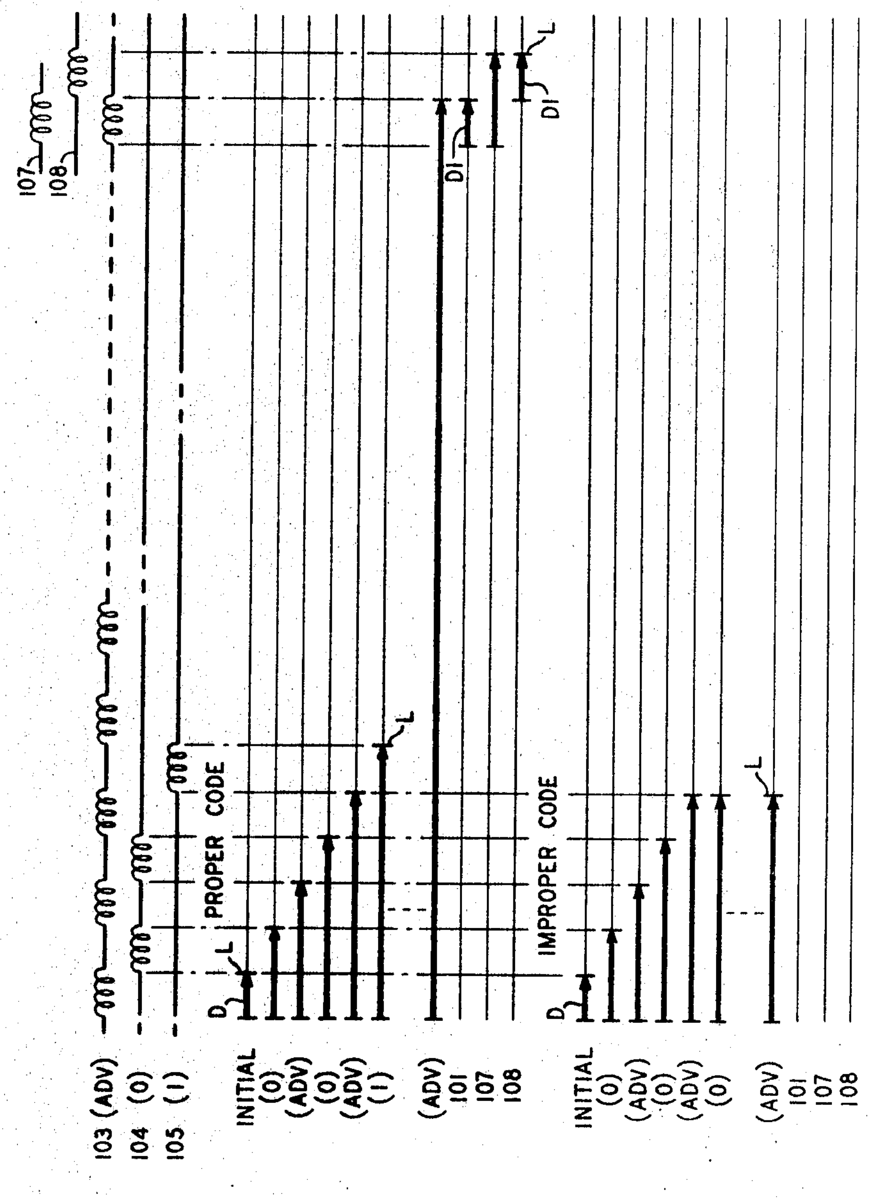
FIG. 8 is a chart showing the magnetic state of a character recognizer of FIG. 1 during operation.

The operation of the recognizer is understood more fully in connection with FIGS. 8 and 9. Since the recognizers are coded for a sequence of zeros with a one in a coded position, all we need demonstrate is the expansion of a domain past the one coded position in a character recognizer in response to a proper code and the failure of a domain to expand past the one coded position in the absence of a proper code.

FIG. 8 shows the couplings of conductors 103, 104, and 105 of FIG. 7. The domain D is represented, as in FIG. 7 by a bounded arrow directed to the right. A zero pulse on conductor 104 advances the leading wall L of domain D to the right as shown. A next advance field again advances wall L to the right. A next subsequent zero pulse on conductor 104 further advances wall L as does a next subsequent advance field. A "one" pulse is required next on conductor 105 in order to advance wall L further. For the proper code 001 . . . , the wall L again so advances and, in response to subsequent zero pulses and interleaved advance fields, passes to a position coupled by conductor 107 eventually to provide an output. For the improper code 000 . . . , the wall L does not advance into the position coupled by conductor 105 and no output is later provided.

FIG. 8 specifically illustrates domain expansion in response to the proper and improper first decimal digit. If the recognizer is coded to recognize more than a single decimal digit, there is a portion along the wire DW1 uncoupled by conductor 101 of FIG. 7. Any domain D having a wall L fully advanced by a proper code corresponding to the first decimal digit recognized by a particular recognizer is at that uncoupled position. Next applied pulses on conductors 108 and 107 advance that domain through the corresponding uncoupled position forming domain D1 as shown in FIGS. 7 and 8. For the improper code, of course, no domain is in a position to advance in response to those pulses. A domain D1 remains as shown in FIG. 8 only if the proper code is applied.

The process repeats for the second decimal digit as for the first digit resulting in a domain D2 as shown in FIG. 7. Again the process repeats for the third digit resulting in the advance of a wall L past the portion of wire DW1 coupled by conductor 109 inducing an output signal therein for detection by the central office connect equipment.

No all codes are three digits, however, as is well known. Some of the recognizers may be organized so that only the first digit portion is coded. When a one digit code, such as –0– for operator, appears, the recognizer so coded responds and domains in all other recognizers are annihilated upon interrogation. A recognizer coded to recognize only a single decimal digit representation need be only one digit long having a sense coupling (109) appropriately positioned therealong. A similar arrangement is possible for two-digit codes also.

The advance of a leading domain wall of a reverse domain in a magnetic medium in response to propagation fields of the type generated in accordance with this invention is well understood in the art and is not discussed further herein.

In those recognizers where "don't care" coils are present, either a "zero" or a "one" pulse advances a leading wall past the portion of the domain wall wire coupled by a "don't care" coil moving the wall to a position to be effected by the field generated in response to the next pulse on conductor 103.

Now let us consider the case where a code 321 is dialed by a subscriber and follow the operation of the circuit of FIG. 1 from the depression of the pushbuttons of FIG. 5, to the formation of consecutive domains as shown in FIG. 4, to the recognition thereof by a recognizer correspondingly coded as shown in FIG. 7.

Operation is initiated when a subscriber goes off-hook providing an initiating start of call pulse P*i* at time *t*0 in FIG. 9 in conductor 106 of FIG. 7. A reverse domain D is provided in the coupled portion of the wire DW1 in each character recognizer of FIG. 1.

The subscriber next, at time *t*1 in FIG. 9, depresses the three pushbutton as shown in FIG. 5, providing a coded pulse PC on the H3(L1) conductors of FIG. 3. In response, a domain of length corresponding to a three as shown in FIG. 4 is formed in wire DW of FIG. 2. Simultaneously, propagation pulses are initiated as shown by pulses P1, —P1, P2, and —P2.

The circuit of FIG. 2 responds as described hereinbefore to provide a zero output each time a phase three propagation pulse is applied to conductor P1 after the leading wall of the "three" domain reaches that portion of wire DW coupled by the input to amplifier 21 of FIG. 2. The first zero output is represented by the pulse designated 0 at time *t*2 in FIG. 9.

The trailing wall of the three domain provides a one output also as has been described before. Such an output, designated 1, is shown at time *t*3 of FIG. 9. The zero outputs continue thereafter until the requisite number of zeros to correspond to the coding of the character recognizers is provided.

When the leading wall of the three domain reaches the position to initiate the sequence of zeros, it also activates monopulser 20 to provide a second domain thirteen positions behind the leading wall of the first domain as already described. The leading wall of the second domain provides an interrogate pulse P101 (P24) on conductor 101 clearing the wire DW1 in each recognizer of FIG. 1. Such a pulse is shown at time *t*4 in FIG. 9 and serves to clear all wires DW1 of reverse domains except at safe positions along those wires uncoupled by a conductor 101. Each of those recognizers coded to accept a first digit three now includes a domain D1 as shown in FIG. 7. A small number of milliseconds have now passed since the coded pulse PC at time *t*1 occurred.

The subscriber now depresses the digit two pushbutton in accordance with the selected illustrative operation. A domain of length two as shown in FIG. 4 is provided in wire DW of FIG. 2. The operation repeats ultimately resulting in a second interrogate pulse at time *t*5 as shown in FIG. 9. Each recognizer of FIG. 1 coded to receive a three and a two as the first and second digits now includes a domain D2 as shown in FIG. 7.

The subscriber next depresses the one pushbutton as shown in FIG. 5. Again the process repeats and the leading walls of domains D2 advance toward corresponding couplings 109 as shown in FIG. 7. Only one recognizer permits a leading wall to arrive there. The leading walls of domains D2 in recognizers not coded to receive a one as the third digit are stopped short of the coupling of conductor 109 to the corresponding wire DW1 in which each is advanced. Consequently, an output pulse RP0 is provided by only a single recognizer for detection. Such a pulse is shown at time *t*6 in FIG. 9. Operation is terminated when the leading wall of the second domain following the domain (representing the third decimal digit) provides a next consecutive interrogate pulse in conductor 101. Such a pulse is represented by pulse P101 at time *t*7 of FIG. 9.

Should the subscriber go on-hook before completing a call, a domain, say domain D2 of FIG. 7, may be left in one or more recognizers. In this instance, an annihilate pulse is applied conveniently to conductor 107 of FIG. 7 responsive to an on-hook signal.

The description of the illustrative operation is now complete. The output of each recognizer signals the desired connect operation and the subscriber may continue dialing. The code converter 11 of FIG. 1 may be disconnected from the line at this juncture by well known means not shown.

It might be observed that a movement of the coupling of the input of amplifier 21 one position to the left or to the right along wire DW of FIG. 2 changes the output code from a one-out-of-twelve to a one-out-of-eleven or to a one-out-of-thirteen code respectively. Of course, other changes in that position provide different code possibilities. The recognizers are changed accordingly.

Any number of code services may be provided by the telephone system. We may take twenty possible services for an example. It is clear then that twenty recognizers are required in FIG. 1 and the subscriber may dial each code for availing himself of the particular service.

It may be desirable to change a particular code corresponding to a particular service. This is done simply by providing appropriate "don't care" coils in the recognizer corresponding to the code to be added or merely by changing the coded couplings to the recognizer to be changed. These possibilities are implemented conveniently just by replacing a plug-in board to which the coils along a wire DW1 are connected. Each such plug-in board may be arranged in a well known manner to impose a particular code on otherwise uncoded coils. Alternatively, uncoupled "don't care" coils already present in the recognizers may be coupled to permit recognition of additional codes. An additional recognizer is required only when the number of services provided by the system is increased from say twenty to twenty-one.

It may happen, for example, in extending services to larger geographical areas that certain codes are already in use and different codes in different areas served have to be chosen to initiate a particular service. Again, the necessary changes are carried out simply as just described and no additional recognizers are required. It will be appreciated that such code changes in relay trees may not be so simply achieved. A 235 code may be desired, for example, but all the contacts to the third relay in the bank of relays corresponding to the second decimal digit position may be in use. Considerable adjustment is necessary.

What has been described is considered only illustrative of the principles of this invention. Accordingly, other and different arrangements according to the principles of of this invention may be devised by one skilled in the art without departing from the spirit and scope of this invention. For example, the invention has been disclosed in terms of a domain wall wire implementation. It should be quite clear to one skilled in the art, however, that the advantages in accordance with this invention may be achieved by means of any sequence detector and bit stream generator functioning as described. Such elements may be implemented, for example, by means of this film domain wall devices and also by means of monolithic semiconductor arrangements.

What is claimed is:

1. A code translator comprising means responsive to each of a plurality of input codes for generating a corresponding sequential output comprising a single first binary value in a coded position in a sequence of *m* second like binary values and a plurality of sequence recognizers, each responsive to a different one of said sequential outputs, for providing a corresponding output signal.

2. A code translator in accordance with claim 1 wherein said input codes comprise consecutive decimal digit representations and said means responsive to said input codes generates consecutive sequences of *m* second binary values with a first binary value in a coded position in said sequence indicative of said decimal digit representation.

3. A code translator in accordance with claim 2 wherein said means responsive to input codes comprises a magnetic domain wall medium.

4. A code translator in accordance with claim 2 wherein each of said sequence recognizers comprises a magnetic domain wall medium.

5. A domain wall code translator comprising a domain wall two-out-of-*n* to one-out-of-*m* code converter and a plurality of domain wall sequence detectors each responsive to a different output of said code converter, said code converter comprising a domain wall medium, means responsive to each code of a set of coded input signals for providing a first reverse domain of corresponding length in said medium and for advancing said domain in a first direction through said medium, means responsive to the arrival of said first domain at a first position for providing a corresponding second domain at a second position in said medium, means for advancing domains synchronously toward an output position in said medium, and means responsive to leading and trailing edges of said first domain and to the corresponding second domain for initiating a sequence of binary zero outputs, for introducing a binary one output in a coded position in said sequence, and for terminating said sequence, respectively, each of said detectors also comprising a domain wall medium, means for introducing a second reverse domain into an input position in each of said last-mentioned media, means defining first spaced apart position in each of said media, first code means responsive to each of said first binary outputs for controlling the expansion of said domain in coded ones of second positions intermediate said first positions, second code means responsive to each of said second binary outputs for controlling the expansion of said domain in the remainder of said second positions, means for detecting the passage of the leading wall of said domain at an output position spaced apart from said input position, and means for annihilating domains in said medium in positions other than said output position.

6. A two-out-of-*n* to one-out-of-*m* code converter comprising a propagating medium, means responsive to each code of a set of coded input signals for providing a first discontinuity of corresponding length in said medium, means responsive to each of said codes for advancing discontinuities toward an output position in said medium, means responsive to the arrival of said first discontinuity at a first position for providing a corresponding second discontinuity at a second position in said medium, and means responsive to the arrival of said leading and trailing edges of said first discontinuity and to the corresponding second discontinuity at said output position for initiating a sequence of first binary outputs, for introducing a second binary output in a coded position in said sequence, and for terminating said sequence, respectively.

7. A two-out-of-*n* to one-out-of-*m* code converter in accordance with claim 6 wherein said propagation medium comprises a magnetic domain wall medium, and each of said discontinuities comprises a reverse magnetized domain.

8. A combination comprising a plurality of sequence detectors each including a domain wall medium, means for defining spaced apart first positions in each of said media, means responsive to a first control signal for generating a reverse magnetized domain in an input position in each of said media, first means responsive to first coded signals for expanding said reverse domain in corresponding coded ones of second positions intermediate said first positions, second means responsive to second coded signals for expanding said reverse domain in corresponding remaining ones of said second positions, means responsive to a repetitive signal for expanding said domain in said first positions, means responsive to an annihilate signal for annihilating said reverse domain in all but prescribed positions in each of said media, and means interleaving said first and second control signals and said annihilate signal to provide a reverse domain in consecutive ones of said prescribed positions only in response to prescribed consecutive patterns of first and second control signals.

9. A combination comprising a propagation medium, means for introducing a discontinuity into an input position in said medium, means for controlling the advance of said discontinuity in first spaced apart positions in said medium, first code means responsive to a first binary value indication for controlling the advance of said discontinuity in coded ones of second positions intermediate said first positions, second code means responsive to a second binary value indication for controlling the advance of said discontinuity in the remaining said second positions, means for responsive to an annihilate signal annihilating discontinuities in said medium in all but prescribed positions, means interleaving said first and second binary value indications and said annihilate signal such that said domain is in consecutive prescribed positions when said annihilate signal is applied only when consecutive first and second binary value indication patterns correspond to the consecutive patterns of coded and remaining second positions respectively, and means for detecting said discontinuity at an output position spaced apart from said input position.

10. A combination in accordance with claim 9 wherein said medium comprises a magnetic domain wall medium, said discontinuity comprises a reverse magnetized domain, and said remaining second positions comprise a single position.

11. A combination in accordance with claim 10 comprising a plurality of magnetic domain wall wires each having a different pattern of coded and remaining second positions.

References Cited

UNITED STATES PATENTS 2,871,289 1/1959 Cox et al. ---------- 340—347

MAYNARD R. WILBUR, Primary Examiner

J. GLASSMAN, Assistant Examiner

U.S. Cl. X.R.

340—174